Patented Oct. 23, 1945

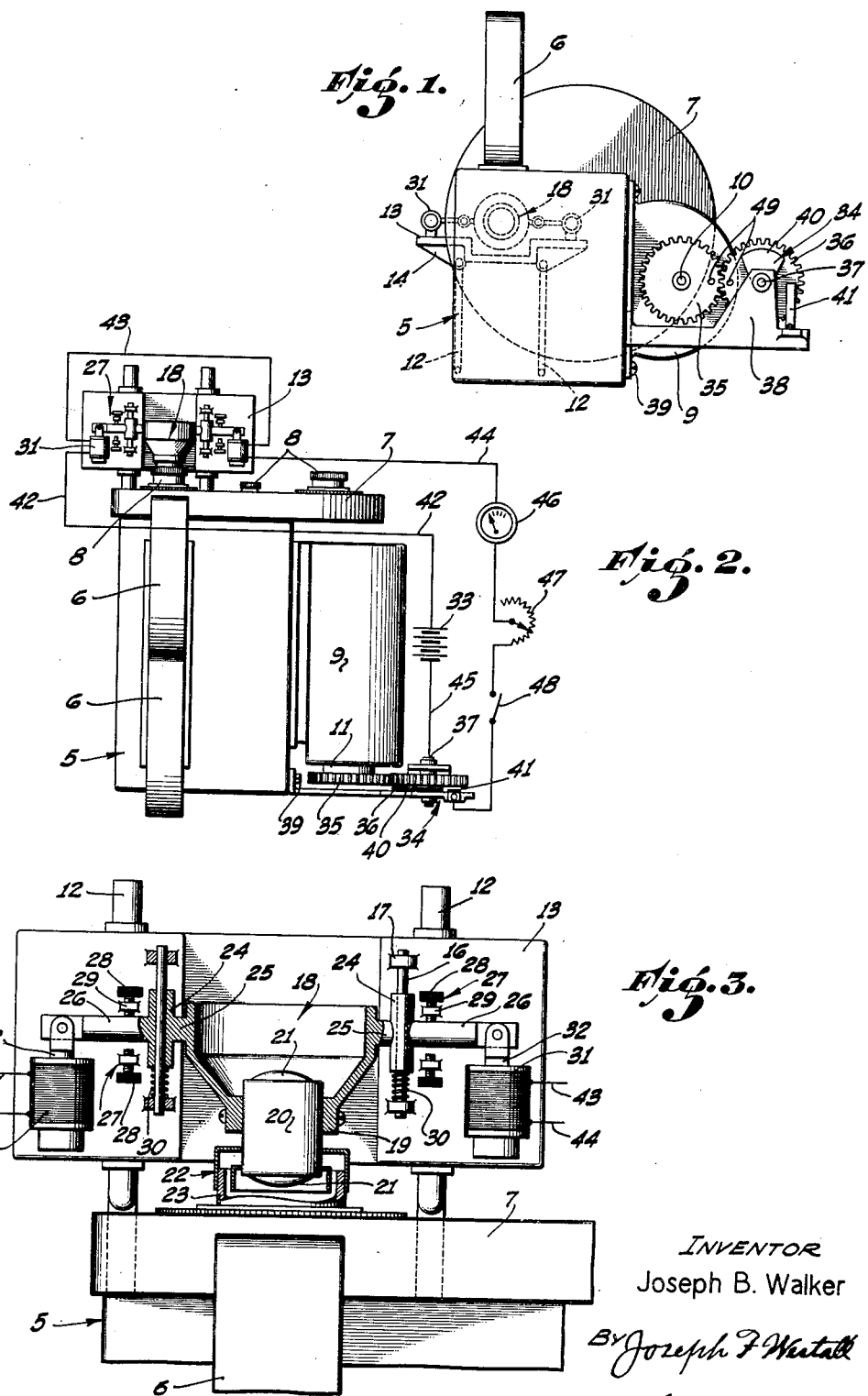

2,387,546

UNITED STATES PATENT OFFICE 2,387,546

CAMERA

Joseph B. Walker, Los Angeles, Calif.

Application May 25, 1942, Serial No. 444,325

6 Claims. (Cl. 88—16)

This invention relates to cameras, and more specifically contemplates an auxiliary lens carrying unit embodying means for shifting axially a lens system controlled thereby to effect an apportionment of the duration of each exposure for focusing successively in each of two object planes to produce a composite image in which an acceptable compromises in the sharpness of the portions of the image corresponding to objects in the respective planes may be obtained in each frame of the film.

It is common knowledge that all camera lenses have a depth of field which extends on each side of an object plane in critical focus, in which field, objects, while not exactly in focus, are sufficiently well defined in the photographic image for practical purposes. It is also quite elementary that within certain limits the size of the stop used will vary the depth of the field.

It is often undesirable or impracticable to reduce the amount of light passing through the lens by stopping down, and yet quite desirable or necessary to increase the depth of the field.

It is a general object of the present invention to provide a camera with an axially movable lens and with means to shift such lens element axially during each exposure to either of two positions, and thereby cause the lens to focus in each of two object planes successively, and produce sharp images of objects in each of said planes, the shift being so slight as not to appreciably vary the image size in either position, thus to secure a practical coincidence of the images registered by the lens element in each of its two positions, whereby the images of objects brought into focus by the shift of the lens will be superimposed upon each other, and on each side of such critically focused object planes the field will be correspondingly widened.

A highly important object is the provision of an auxiliary movable lens element for use with conventional type cameras adapted to extend the depth of field of the lens system thereof to include distinct object planes separated distances greater than the normal focal range of the lens system, which assures maximum sharpness of image of objects in each of said planes by minimizing the time during which the lens system is out of focus with both object planes incident to the transition of the lens element during the exposure.

Another object is to provide a motion picture camera having a lens carrier embodying electrically-operated mechanism which is synchronized with the shutter blade of the camera for shifting a lens element axially at a predetermined instant intermediate the ends of the period of each exposure, said mechanism being adjustable to vary apportionment of the duration of the exposure in each of the two planes before and after the shift of the lens element.

Another object is to provide apparatus operable in conjunction with the mechanism above alluded to for limiting the degree of axial movement of the lens element to prescribed limits in accordance with the distance between the object planes desired to be brought into focus, as well as the distance between the lens and focal plane.

Other objects and corresponding advantages, such for example as adjustability to apportion the exposure period to either of the two planes of critical focus, simplicity of construction, ease of assembly and disassembly with any of a plurality of conventional type motion picture cameras, and positive and controlled operation at all times, will be apparent to those skilled in the art upon an examination of the following description read in the light of the accompanying drawing, in which:

Fig. 1 is a rear elevation of a motion picture camera illustrating the means by which the apparatus comprising my invention is synchronized with the camera, and showing in dotted lines the auxiliary lens carrier;

Fig. 2 is a plan view of the camera and lens carrier operatively associated, depicting the electrical connections through which my invention is energized;

Fig. 3 is an enlarged view of the camera partially broken away, and illustrating the details of the carrier and its actuating elements.

Referring to the drawing in detail, the numerals of which indicate similar parts throughout the several views, 5 designates a motion picture camera frame having film magazines 6 mounted on the top thereof. A common type of lens turret 7 shown pivoted to the front of the camera mounts a series of lenses 8 adapted to be brought into registry selectively with the camera aperture (not shown). A casing 9 is secured to the side of the camera frame in which the motor for synchronizing the sound mechanism with the camera and for other well-known purposes is located. The motor shaft 10 is journalled in and protrudes from the back of casing 9 for the non-rotatable attachment of a disk 11 in accordance with the usual construction. The camera structure also includes a pair of parallel rods 12 which project from the front of frame 5 below and at either side of the optical axis for the support of any of the various well-known attachments commonly utilized for special purposes.

The apparatus of my invention is carried principally by rods 12, and comprises a base member 13 having depending perforated webs 14 which are fitted over rods 12, respectively, for sliding movement thereon. Any means well known in the art such as set screws or the like (not shown) may be employed to secure the base member 13 against movement on rods 12 in response to vibration, etc., during use, but which permit removal of the apparatus when not needed. A pair of guide rods 16 having their ends mounted in lugs 17, integral with the upper surface of base member 13, are arranged parallel with and equi-spaced from the optical axis of the camera. A lens carrier 18 is slideably mounted on guides 16, and comprises a tubular lens mount 19 having a reduced opening at one end thereof into which is fitted a tubular frame 20 carrying the lenses 21—21. A circular light trap 22 adapted to be brought into operative association with the rim of the particular lens frame 23 of turret 7 which is prearranged to axially coincide with the camera aperture, encircles and is fastened to the lens frame 20. The lens mount 19 is connected to a pair of sleeves 24 slideably disposed on the guides 16, respectively, by connecting rods 25. Coaxial control rods 26 project laterally from and are integral with respective sleeves 24, for a purpose about to be described. The extent of movement of carrier 18 longitudinally of guides 16 in either direction may be variably determined by adjustment of a pair of stops 27 located, respectively, on opposite sides of each control rod 26. Each stop consists of a knurl-headed screw 28 threaded through a lug 29 integral with base member 13 and in the line of lateral movement of control rods 26. A helical spring 30 encircles each guide rod 16 between the lug 17 nearest adjacent the camera and sleeve 24 to exert an expansive urge against the latter, and normally maintain the carrier 18 against the forward stops 27. In the preferred embodiment, as will be described more in detail, carrier 18 is permitted to occupy this position in the beginning of each exposure.

A pair of solenoids 31 are suitably attached to the base member adjacent but rearwardly of the outer ends of control rods 26, respectively. The coils 31 are wound and electrically connected, as will be described, to draw their respective cores 32 rearwardly upon energization. The forward end of each core 32 is pivotally connected to the outer end of its adjacent control rod 26. Electric current is supplied to the solenoids from a source of electricity 33. A rotary switch 34 is provided to control an electric circuit through solenoids 31 for the intermittent energization of the latter, and comprises a gear 35 secured on the motor shaft 10 so as to turn therewith. A pinion 36 secured against rotation on a shaft 37, having its ends journalled in a mounting 38 attached to the camera frame as at 39, is held in mesh with gear 35, by which it is rotated. An electric switch segment 40 is secured to shaft 37 at one side of pinion 36 so as to turn therewith, and, with each revolution of the pinion, brush an upstanding contact 41 carried by mounting 38. The solenoids 31 are wound in opposite directions in the embodiment illustrated, and are connected in series to the source of electricity by wires 42 and 43. An electric conduit 44 connects the second solenoid 31 of the series with switch contact 41. The circuit is completed during contact of segment 40 with the switch contact 41 by a wire 45 extending between shaft 37 and the source of electricity 33. The conduit 44 extends through a suitably located meter 46, rheostat 47 and manually-operated switch 48, provided for purposes hereinafter referred to.

The operation of my invention is briefly described as follows. The switch 48 is closed and the rheostat 47 adjusted to assure the transmission of sufficient electricity to energize solenoids 31 and actuate the carrier 18 upon closing of the rotary switch 34. Upon actuation of the camera, gear 35 will be turned by the synchronizing motor so as to rotate the pinion 36 and swing the switch segment 40 about the axis of shaft 37. Segment 40 will accordingly be brought into intermittent engagement with the switch contact 41 to alternately open and close the circuit, i. e., the solenoids 31 will be energized during a part of the time required for each revolution of pinion 36 corresponding to the period during which the rotary switch 34 is closed, the duration of the period depending upon the speed of rotation of pinion 36 and the arcuate length of segment 40. As hereinabove explained, energization of solenoids 31 draws their respective cores 32 rearwardly, causing a corresponding shift of the lens carrier 18 against the rear stops 27 to focus the dual lens 21—21 in a different object plane. As the switch segment 40 moves out of engagement with contact 41 the circuit will be opened and springs 30 will return the carrier 18 to its forward position for the next exposure.

It will be understood that in assembling rotary switch 34, the apparatus of my invention is synchronized with the shutter or blade (not shown), which controls admission of light through the aperture of the camera, in order that the switch segment 40 will maintain the circuit to solenoids 31 closed a predetermined part of each exposure period. To facilitate proper assembly of the apparatus and assure the essential synchronization of movement of the lens carrier with the operation of the shutter mechanism of the camera, dots or lines may be marked adjacent the peripheries of the gear and pinion and located circumferentially on the latter, as indicated at 49—49, to denote, upon alignment of the dots or lines during assembly, the proper relative rotative disposition of these parts.

The apparatus may be constructed to permit a facile substitution of switch segments variable in arcuate length for segment 40 so as to increase or decrease the period of the duration of each exposure during which the lens carrier 18 is in its retracted position relative to the part of the exposure period during which the carrier is in its forward position. It will thus be observed by the proper selection of the switch segment 40 to be used, any desired apportionment of the period of exposure to focusing in the respective object planes may be made, and correspondingly a variable but predetermined degree of relative sharpness of the images of objects in the respective object planes may be obtained.

While I have shown but one embodiment of my invention, it will be understood that numerous changes in size, design, number and proportion of the various parts may be made, that the apparatus is equally adapted for embodiment in still picture cameras, and that in cameras in which the film spools are driven manually or by spring tension, the device of my invention may be actuated by like means, all without departing from the spirit of my invention as defined in the appended claims.

What I claim and desire to secure by Letters Patent is:

1. In a device of the character described, a camera, a lens carrier, a lens element supported by said carrier, guide means associated with the camera for the slideable support of said lens carrier, electrically operated means to shift at a constant speed the lens carried from one stationary position relative to the focal plane of the camera to another such stationary position during each of a pair of successive exposures of the camera, means to selectively apportion time of exposure between said one position and the position to which the lens is shifted and means to return the lens carrier to its original position during the interim between said exposures.

2. In a device of the character described, a motion picture camera, a movable lens carrier associated with said camera, a lens element mounted in said carrier, means to guide said lens carrier for axial movement of the lens element, magnetic means for shifting said lens carrier relative to the focal plane of the camera, means for energizing said magnetic means, and switch mechanism controlling said last-named means actuated in synchronism with the operation of the camera mechanism to energize said magnetic means at a predetermined time after the beginning of each exposure period of the camera, and means to retain said lens carried in a predetermined position to which it has previously been moved by said magnetic shifting means, during the remainder of each exposure period.

3. In a device of the character described, a motion picture camera having a lens system and a support adjacent the latter, a lens carrier mounted on said support, an auxiliary lens element retained in said carrier in position coaxial with the lens system of the camera, means operating synchronously with the shutter blade of the camera to shift said carrier to move said lens element axially, and means to retain said lens element in its initial position and in its shifted position successively during, respectively, complementary parts of each exposure period.

4. In a device of the character described, a camera having a lens system and a support adjacent the latter, a lens carrier mounted on said support, an auxiliary lens element retained in said carrier in position coaxial with the lens system of the camera, means operating synchronously with the shutter operation of the camera to shift said carrier to move said lens element axially, and means to retain said lens element in its initial position and in its shifted position successively during, respectively, complementary parts of each exposure period.

5. In a device of the character described, a camera having a lens system and a support adjacent the latter, a lens carrier mounted on said support, an auxiliary lens element retained in said carrier in position coaxial with the lens system of the camera, means connected to and operating synchronously with means for operating the shutter of the camera to shift at uniform speed said carrier to move said lens element axially, and means to retain said lens element in its initial position and in its shifted position successively during, respectively, complementary parts of each exposure period.

6. In a device of the character described, a motion picture camera having a lens system and a support adjacent the latter, a lens carrier mounted on said support, an auxiliary lens element retained in said carrier in position coaxial with the lens system of the camera, means synchronized with the operation of the shutter-blade of the camera to shift said carrier to move said lens element axially, and means to retain said lens element in its initial position and in its shifted position successively during, respectively, complementary unequal parts of each exposure period.

JOSEPH B. WALKER.